United States Patent [19]

Tanaka et al.

[11] Patent Number: 5,434,012
[45] Date of Patent: * Jul. 18, 1995

[54] MULTILAYER SLIDE BEARING AND BEARING ASSEMBLY

[75] Inventors: Tadashi Tanaka, Konan; Masaaki Sakamoto, Nagoya; Koichi Yamamoto, Komaki; Yoshikazu Mizuno, Nagoya; Tohru Kato, Seto, all of Japan

[73] Assignee: Daido Metal Company, Ltd., Nagoya, Japan

[*] Notice: The portion of the term of this patent subsequent to Jan. 24, 2012 has been disclaimed.

[21] Appl. No.: 118,638

[22] Filed: Sep. 10, 1993

[30] Foreign Application Priority Data

Sep. 17, 1992 [JP] Japan ................... 4-247423

[51] Int. Cl.$^6$ ........................................... F16C 33/12
[52] U.S. Cl. ................... 428/643; 428/645; 428/652; 428/674; 428/675; 384/912
[58] Field of Search ............... 428/643, 644, 645, 646, 428/647, 653, 652, 674, 675, 676; 384/912

[56] References Cited

U.S. PATENT DOCUMENTS

| | | | |
|---|---|---|---|
| 2,386,951 | 10/1945 | Howe | 428/675 |
| 2,569,149 | 9/1951 | Brennan | 428/652 |
| 2,766,195 | 10/1956 | Combs et al. | 428/652 |
| 2,911,708 | 11/1959 | Fike et al. | 428/652 |
| 3,810,287 | 5/1974 | Pryor et al. | 428/652 |
| 4,206,268 | 6/1980 | Roemer et al. | 428/675 |
| 5,112,416 | 5/1992 | Tanaka et al. | 384/912 |
| 5,185,216 | 2/1993 | Tanaka et al. | 384/912 |

FOREIGN PATENT DOCUMENTS

| | | |
|---|---|---|
| 0029471 | 12/1979 | European Pat. Off. . |
| 902694 | 1/1954 | Germany . |
| 1086899 | 8/1960 | Germany . |
| 1198566 | 8/1965 | Germany . |
| 8001995 | 4/1981 | Germany . |
| 2747545C2 | 1/1987 | Germany . |
| 3917899A1 | 12/1989 | Germany . |
| 4036835A1 | 5/1991 | Germany . |
| 54-158363 | 12/1979 | Japan ................... 428/652 |
| 461845 | 2/1937 | United Kingdom . |
| 597113 | 1/1948 | United Kingdom . |
| 0692190 | 9/1950 | United Kingdom . |

OTHER PUBLICATIONS

Goodfellow: "Metalle Legierungen Verbindungen Keramiken Polymere Verbundwerkstoffe", Catalog 1993/94, p. 108.

Schmitt-Thomas, K. G. "Systematische Zusammenstellung von Nichteisenmetallen" (systematic list of non-ferrous metals); Technical University of Munich, Jul. 1988, pp. 38–41.

Primary Examiner—John Zimmerman
Attorney, Agent, or Firm—Browdy and Neimark

[57] ABSTRACT

A slide bearing which is preferably used in combination with a low-rigid aluminum alloy housing. The slide bearing has a high coefficient of thermal expansion so that it can satisfactorily follow up deformation of the housing, and the bearing also has an excellent heat radiation property. In the slide bearing, an overly bearing layer having a thickness of 3 to 50 μm is provided on a copper alloy layer having a coefficient of thermal expansion of $15 \times 10^{-6}/°C$. or more, a coefficient of thermal conductivity of 0.40 cal/cm sec °C. or more and 0.2% proof stress of 295N/mm$^2$ or more. As occasion demands, the slide bearing may be (1) provided with an intermediate layer between the copper alloy layer and the overlay bearing layer, or (2) flash-plated on an entirety surface of the bearing.

20 Claims, 1 Drawing Sheet

MULTILAYER SLIDE BEARING AND BEARING ASSEMBLY

BACKGROUND OF THE INVENTION

1. Industrial Field of the Invention

The present invention relates to a multilayer slide bearing comprising a backing metal of copper alloy and an overlay bearing layer, for use in an internal combustion engine of an automobile.

2. Description of the Prior Art

As a conventional multilayer slide bearing, there is known a bearing in which a bearing layer of an Al-Sn system alloy, an Al-Sn-Si system alloy, an Al-Zn system alloy, an Al-Zn-Si system alloy, a Cu-Pb system alloy, or a Cu-Pb-Sn system alloy is formed on a surface of a backing metal (made of, for example, JIS 3141-SPCC, SAE 1010 or the like). The backing metal used in such kind of slide bearing is generally formed of low carbon steel. On the other hand, a housing of retaining the bearing is formed of cast iron, cast steel, carbon steel or alloy steel. A coefficient of thermal expansion of the housing is approximately similar to that of the backing metal. For the reasons, a gap is hardly defined between the bearing and the housing even when the temperatures thereof increase during operation of the automobile, which results in no problems.

Conventionally, properties of a bearing alloy have mainly been regarded as characteristics of a bearing. As regards a backing metal, the workability and bonding property with respect to the bearing alloy have been regarded as more important than the metallic features of the backing metal.

In recent days, however, applications of aluminum alloy to an engine block or a connecting rod of an internal combustion engine for an automobile tends to increase for achieving fuelsaving purposes and lightweight purposes. In such a case where the aluminum alloy is used for a member of a bearing housing, in a conventional bearing utilizing a backing steel, a difference of coefficients of thermal expansion between the bearing and the housing is considerably large, so that a close-contact relationship between the bearing and the housing is lost when the bearing is heated to a high temperature. Thus, the bearing suffers from damage such as fatigue due to fretting or seizure, and attendant damage. The fretting means damage of two contact surfaces caused when small relative movement is periodically repeated between the surfaces. Particularly, in the connecting rod, not only the bearing but also the connecting rod itself may be broken due to fatigue. As mentioned above, the conventional slide bearing has a problem in fretting resistance. On the other hand, a condition of use of the internal combustion engine becomes severer; that is, the internal combustion engine is operated at a higher speed for a high performance design, which results in a problem that damage such as seizure often occurs at the sliding contact portion.

Moreover, in order to improve an adhesion property of the bearing with respect to the housing at a high temperature or at a high load, a trial has conventionally been made to increase an interference between the bearing and the housing to be assembled with each other. The conventional bearing employing a low carbon steel backing metal is, however, not satisfactory as a member of a bearing assembly because the backing metal is low in strength so that settling occurs in the backing metal when the bearing is assembled in the housing under a high assembling stress exceeding an elastic limit of the backing metal, because a coefficient of thermal conductivity of the backing metal is low and therefore, the heat dissipation capacity is insufficient, or because the backing metal is inferior in anti-seizure property.

SUMMARY OF THE INVENTION

The present invention is directed to cope with a low-rigid bearing housing represented by an aluminum alloy bearing housing adopted in an aluminum alloy engine block related to a size-reduction or lightweight design of an internal combustion engine, and the invention also aims at a countermeasure for a high temperature tendency of the internal combustion engine resulted from a high-speed or a high-engine speed design represented by a high-speed internal combustion engine.

An objective of the invention resides in providing a novel slide bearing which can satisfactorily follow up deformation of a bearing housing and has an excellent heat irradiation property.

In order to cope with an aluminum alloy housing and to prevent damage such as fatigue or seizure resulting from a high temperature and a high load due to a high-performance design of an internal combustion engine, the present invention adopts as a backing metal of a copper alloy having higher coefficients of thermal expansion and thermal conductivity than those of a backing steel and having a strength sufficient as a backing metal layer of a bearing. Key aspects of the present invention are as follows:

1. A multilayer slide bearing in which an overlay bearing layer having a thickness of 3 to 50 $\mu$m is formed on a surface of a copper alloy layer having a coefficient of thermal expansion of $15 \times 10^{-6}/°C$. or more, a coefficient of thermal conductivity of 0.40 cal/cm sec °C. or more, and 0.2% proof stress of 295N/mm$^2$ or more.
2. A multilayer slide bearing according to the above item 1, wherein an intermediate layer having a thickness of 0.5 to 5 $\mu$m, which intermediate layer is made of one kind of metal selected from the group consisting of Ni, Co, Fe, Ag and alloys each containing one of those elements as a main component, is provided between the copper alloy layer and the overlay bearing layer.
3. A multilayer slide bearing according to the above item 1 or 2, wherein the overlay bearing layer is formed of a lead alloy containing by 2 to 30 wt. % in total one or more kinds of metals selected from the group consisting of Sn, In, Sb and Cu.
4. A multilayer slide bearing according to the above item 1 or 2, wherein the overlay bearing layer is formed of an aluminum alloy containing by 2 to 60 wt. % in total one or more kinds of metals selected from the group consisting of Sn, Pb and Sb.
5. A multilayer slide bearing according to either of the above items 1 to 4, wherein Sn, Pb or an alloy of Sn or Pb is flash-plated on an entire surface of the bearing to have a thickness of 0.1. to 10 $\mu$m.
6. A bearing assembly in which the multilayer slide bearing described in either of the items 1 to 5 is retained within a housing of an aluminum alloy.

DETAILED DESCRIPTION OF THE INVENTION

The details of the multilayer slide bearing of the invention will be described hereinafter.

A. Reasons why the copper alloy having a coefficient of thermal expansion of $15 \times 10^{-6}/°C$. or more, 0.2% proof stress of $295N/mm^2$ or more and a coefficient of thermal conductivity of 0.40 cal/cm sec °C., is adopted:

A-1) A plastic workability of a backing metal material used in a conventional bearing is regarded as an important matter, in case of processing the material into a semicircular shape or a semicircular shape having a flange. Thus, a low carbon steel having a small deformation resistance and containing carbon by 0.20% or less is generally selected.

In the bearing for a low-rigid housing, it is necessary to determine an interference between the bearing and the housing at a large value, for the purpose of increasing the following-up ability of the bearing with respect to deformation of the housing. This is the case, the assembling stress is too large so that settling occurs in the backing metal having a low strength formed of low carbon steel with a content of carbon of 0.20% or less and the backing metal yields in many cases. The bearing is accordingly required to have 0.2% proof stress of $295N/mm^2$ or more.

When the coefficient of thermal expansion is lower than $15 \times 10^{-6}/°C$., a difference in thermal expansion between the bearing and an aluminum alloy housing is large. As a result, the interference is decreased at a high temperature, which is a main cause of fretting or migration. Therefore, the coefficient of thermal expansion must be $15 \times 10^{-6}/°C$. or more.

A-2) In a high-speed rotation type internal combustion engine, the temperatures of the bearing and the lubricant oil are increased by an influence of frictional heat generated between the bearing and the rotary shaft during operation of the engine, so that a thickness of an oil film formed between the bearing and the shaft is reduced to decrease a wear resistance of an overlay layer of the bearing. In this connection, not only ordinal characteristics of the bearing but also a heat dissipation capacity are important matters. In a bearing utilizing a backing metal of copper alloy having a high coefficient of thermal conductivity, its heat dissipation capacity is excellent and accordingly, the above problems are solved. If the coefficient of thermal conductivity is less than 0.40 cal/cm sec °C., the heat dissipation capacity is insufficient. As copper alloys having the aforesaid high coefficients of thermal expansion and thermal conductivity, there are concretely listed a Cu-Cr system alloy, a Cu-Cd system alloy, a Cu-Zr system alloy, a Cu-Fe-P-Mg system alloy, a Cu-Fe-P-Zn system alloy, a Cu-Fe-P-Sn system alloy, a Cu-Ni-Si-Mg system alloy and so on. The components of the alloys should not be limited to the above if the various properties are fulfilled.

B. The intermediate layer interposed between the copper alloy layer and the overlay bearing layer:

The intermediate layer acts to prevent Sn and/or In which are components of the alloy of the overlay bearing layer (surface layer) from dispersing into the backing copper alloy layer and to maintain the characteristics of the overlay bearing layer. When the thickness of the intermediate layer is less than 0.5 μm, its effect is insufficient, and in the case where the thickness exceeds 5 μm, the overlay bearing layer is worn so that the anti-seizure property is deteriorated when the intermediate layer (or barrier layer) is exposed.

The increase in thickness of the intermediate layer leads to increase of the cost, and is quite disadvantageous. Incidentally, the intermediate layer is generally formed by electroplating, but it may be formed by PVD method, CVD method and so on and it is not restricted particularly.

C. The lead alloy overlay bearing layer:

When the content of at least one of Sn, In, Sb and Cu added to the lead alloy overlay bearing layer are less than 2 wt. % in total, the overlay bearing layer is inferior in mechanical strength such as hardness and tensile strength, and corrosion resistance against organic acid generated when the lubricant oil deteriorates. When the total contents exceed 30 wt. %, the mechanical strength in a temperature range of 100° to 150° C. where the slide bearing is used is remarkably reduced. Therefore, the total content of the metal components added to the lead alloy overlay layer is limited to 2 to 30 wt. %, preferably 5 to 25 wt. %. Incidentally, the lead alloy overlay bearing layer is generally formed by electroplating, but it may be formed by sputtering. The method of forming the overlay bearing layer is not particularly restricted.

D. The aluminum alloy overlay bearing layer:

When the content of at least one of Sn, Pb and Sb added to the aluminum alloy overlay bearing layer are less than 2 wt. % in total, the overlay bearing layer is inferior in conformability and anti-seizure property. When the total contents exceed 60 wt. %, the mechanical properties particularly, strength in a temperature range of 100° to 150° C. wherein the slide bearing is used is considerably reduced. Therefore, the total contents of the metals added to the aluminum alloy overlay layer is limited to 2 to 60 wt. %, more preferably to 5 to 55 wt. %. The aluminum alloy may contain Cu, Si, Ni, or another element for increasing the strength of the overlay bearing layer. Incidentally, the aluminum alloy overlay bearing layer is formed by roll bonding, sputtering and so on. The method of the forming is not particularly restricted.

E. Flash-plating:

Flash-plating is carried out for mainly preventing the bearing from rust or improving a primary fitness. In the case where a thickness of the flash-plated layer is less than 0.1 μm, its effect is insuffcient. On the other hand, when the thickness exceeds 10 μm, the effect is not enhanced but diminished. The too-large thickness may cause occurrence of migration.

EXAMPLE

EXAMPLES OF THE PRESENT INVENTION

Figure 1:
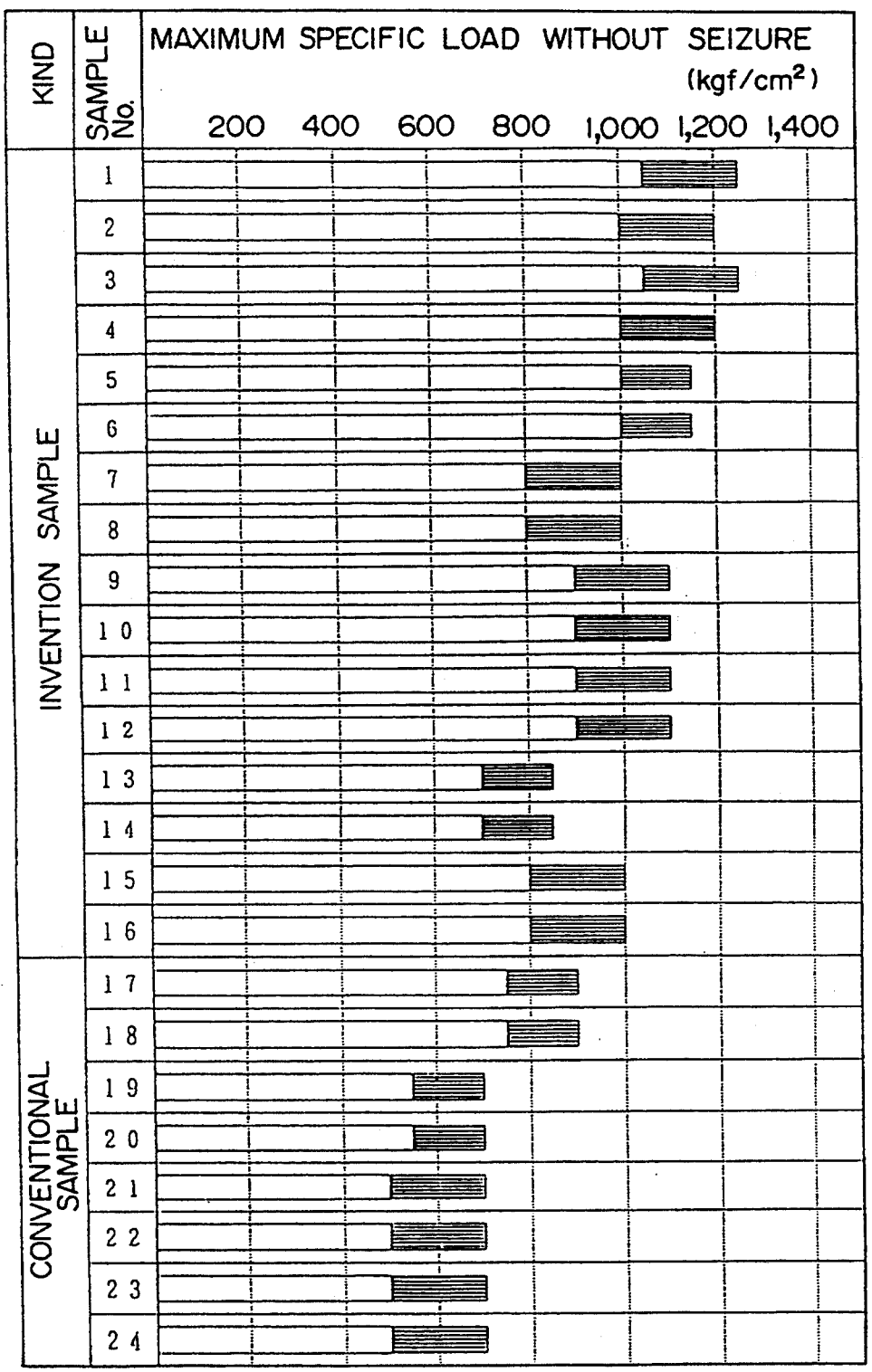
FIG. 1 is a graph showing experimental results (the maximum specific load without seizure) of a high-speed seizure test.

To obtain a backing metal of a multilayer slide bearing according to the invention, a Cu-Cr alloy plate and a Cu-Fe-Zn-P alloy plate on the market were rolled to have predetermined sizes. Subsequently, they were pressed and machined into a semicircular bearing. Further, an overlay bearing layer having a thickness of 20 μm is applied directly or via a Ni intermediate layer on an inner surface of the bearing (i.e., a curved concave surface of the semicircular bearing). Thus, bearings to be tested were manufactured as samples of the present invention (Nos. 1 to 16) shown in Table 1.

Incidentally, the Ni intermediate layer and the overlay bearing layer were formed by electroplating. A lead alloy was used for the overlay bearing layer. In another case where the overlay bearing layer was made of an aluminum alloy, it was formed by sputtering.

COMPARATIVE EXAMPLE 1

Copper/lead alloy powder or copper/lead/tin alloy powder shown in Table 1 was sprayed to a copper-plated surface of a steel plate, and the sprayed layer on the steel plate was sintered at 700° to 900° C. for 10 to 30 minutes within a furnace of reducing atmosphere. Then, the thus-obtained multilayer sintered material was rolled, and an operation of re-rolling after re-sintering was repeated to provide a sintered bimetal. Thereafter, the sintered bimetal was press-formed and machined into a semicircular bearing. Further, an overlay bearing layer having a thickness of 20 μm is applied directly or via a Ni intermediate layer on an inner surface of the bearing. In this way, bearings to be tested were manufactured as samples of the prior art (Nos. 17 to 22) shown in Table 1.

Incidentally, the Ni intermediate layer and the overlay bearing layer of a lead alloy were formed by electroplating.

COMPARATIVE EXAMPLE 2

A workpiece was manufactured from an Al-Si-Zn system bearing alloy listed in Table 1 by continuous casting. After cutting the surface, rolling and annealing operations were repeated to finish the workpiece into a predetermined size. Then, the workpiece was roll-bonded to a backing steel sheet directly or via a Ni intermediate layer. Thereafter, the workpiece was pressed and machined into a semicircular bearing. Further, an overlay bearing layer having a thickness of 20 μm is applied directly or via a Ni intermediate layer on an inner surface of the bearing. Thus, bearings to be tested were manufactured as samples of the prior art (Nos. 23, 24) shown in Table 1.

Incidentally, the Ni intermediate layer and the overlay bearing layer of a lead alloy were formed by electroplating.

Table 2 shows various kinds of properties such as tensile strength, a coefficient of thermal expansion and so on of the copper alloys and SPCC (cold rolled carbon steel sheets) used as the backing plate of the present invention and the prior art.

Table 3 illustrates examples of calculation results (Pr=1 at 20° C.) indicating changes of interference (δ), circumferential maximum stress (σ S) and radial stress (Pr) of the bearing in accordance with a change of the temperature. Particularly, in the aluminum alloy housing, the interference and the bearing stress are both reduced according to the increase of the temperature. The rate of this reduction in the prior art is larger than that in the present invention. When the temperature reaches 150° C., the examples of the prior art cannot be perform a function as a bearing. In the copper alloy bearing of the present invention, however, a reduction in the interference and the bearing stress at a high temperature is small, and it is recognized that the bearings of the invention are superior to those of the prior art.

In order to compare the anti-seizure properties of the bearings in the present invention and the prior art under such a condition of use as at a high operation speed, a comparison test was carried out with a high-speed seizure test machine. The details of the test are shown in Tables 4 and 5, and FIG. 1.

After sliding operation for an hour, lubricant oil was supplied at a rate of 150 ml/min., so that a static load was gradually increased. When the temperature of a back surface of the bearing exceeded 200° C. or a rapid torque variation occurred, it was judged that seizure happened.

The surface pressure before the seizure happened (the maximum specific load without seizure) is shown in FIG. 1. As clearly understood from the experimental results of FIG. 1, the anti-seizure property particularly at a high temperature in the samples of the present invention is remarkably improved as compared with the samples of the prior art. Therefore, the superiority of the backing copper alloy having a good heat irradiation capacity can be appreciated.

As is apparent from the experimental results of Table 3 and FIG. 1, the multilayer slide bearing obtained by the present invention is superior as a bearing for a low-rigid housing (aluminum alloy housing) and as a bearing for a high-speed engine than the bearing of the comparative example (the conventional bearing) in the various points described above.

More specifically, in the case where the multilayer slide bearing of the invention is used in combination with the low-rigid housing, the slide bearing can preferably absorb deformation of the housing because the bearing has a high coefficient of thermal expansion. Also, when the multilayer slide bearing is employed in a high-speed internal combustion engine, since the slide bearing has a high coefficient of heat conductivity, it effectively prevents the temperatures of the bearing and lubricant oil from increasing, so that the bearing performance can be fully achieved.

As will be apparent from the above, a multilayer slide bearing material including a backing copper alloy layer of the present invention can apparently fulfill a performance more excellent than a conventional multilayer slide bearing using a backing steel in terms of anti-seizure property, in the case where sufficiently large interference between the bearing and a particularly light-weight and low rigid bearing housing to be assembled with each other, cannot be obtained, or under a severe condition of use such as increase of the temperatures of the bearing and the lubricant oil and increase of an inertia force of the bearing housing in a high-speed range of an internal combustion engine.

TABLE 1

| | | BEARING TO BE TESTED | | | |
|---|---|---|---|---|---|
| KIND | No. | BACKING METAL | BEARING ALLOY LAYER | INTERMEDIATE LAYER | OVERLAY |
| INVENTION SPECIMEN | 1 | Cu—Cr | NONE | NONE | Pb—5Sn—7In |
| | 2 | Cu—Cr | NONE | Ni | Pb—5Sn—7In |
| | 3 | Cu—Cr | NONE | NONE | Pb—2.5Cu—10Sn |
| | 4 | Cu—Cr | NONE | Ni | Pb—2.5Cu—10Sn |
| | 5 | Cu—Cr | NONE | NONE | Pb—10Sn |

TABLE 1-continued

BEARING TO BE TESTED

| KIND | No. | BACKING METAL | BEARING ALLOY LAYER | INTERMEDIATE LAYER | OVERLAY |
|---|---|---|---|---|---|
| | 6 | Cu—Cr | NONE | Ni | Pb—10Sn |
| | 7 | Cu—Cr | NONE | NONE | Al—20Sn—1Cu |
| | 8 | Cu—Cr | NONE | Ni | Al—20Sn—1Cu |
| | 9 | Cu—Fe—Zn—P | NONE | NONE | Pb—5Sn—7In |
| | 10 | Cu—Fe—Zn—P | NONE | Ni | Pb—5Sn—7In |
| | 11 | Cu—Fe—Zn—P | NONE | NONE | Pb—2.5Cu—10Sn |
| | 12 | Cu—Fe—Zn—P | NONE | Ni | Pb—2.5Cu—10Sn |
| | 13 | Cu—Fe—Zn—P | NONE | NONE | Pb—10Sn |
| | 14 | Cu—Fe—Zn—P | NONE | Ni | Pb—10Sn |
| | 15 | Cu—Fe—Zn—P | NONE | NONE | Al—20Sn—1Cu |
| | 16 | Cu—Fe—Zn—P | NONE | Ni | Al—20Sn—1Cu |
| CONVENTIONAL | 17 | SPCC | Cu—1.5Sn—23Pb | NONE | Pb—5Sn—7In |
| SPECIMEN | 18 | SPCC | Cu—1.5Sn—23Pb | Ni | Pb—5Sn—7In |
| | 19 | SPCC | Cu—1.5Sn—23Pb | NONE | Pb—2.5Cu—10Sn |
| | 20 | SPCC | Cu—1.5Sn—23Pb | Ni | Pb—2.5Cu—10Sn |
| | 21 | SPCC | Cu—25Pb | NONE | Pb—2.5Cu—10Sn |
| | 22 | SPCC | Cu—25Pb | Ni | Pb—2.5Cu—10Sn |
| | 23 | SPCC | Al—3.5Zn—3Si—1Cu—1Pb | NONE | Pb—10Sn |
| | 24 | SPCC | Al—3.5Zn—3Si—1Cu—1Pb | Ni | Pb—10Sn |

TABLE 2

VARIOUS PROPERTIES

| KIND OF BACKING METAL | TENSILE STRENGTH N/mm$^2$ | 0.2% PROOF STRESS N/mm$^2$ | COEFFICIENT OF THERMAL EXPANSION × 10$^{-6}$/°C. | COEFFICIENT OF THERMAL CONDUCTIVITY Cal/cm sec °C. |
|---|---|---|---|---|
| Cu—Cr | 580 | 550 | 17.8 | 0.864 |
| Cu—Fe—Zn—P | 540 | 465 | 17.4 | 0.625 |
| SPCC | 540 | 500 | 12.0 | 0.140 |

TABLE 3 (1)

EXAMPLE CALCULATION OF INTERFERENCE
(CHANGE ACCORDING TO TEMPERATURE)

| No. | BACKING METAL | HOUSING MATERIAL | ITEM | 20° C. | 100° C. | 150° C. |
|---|---|---|---|---|---|---|
| 1 | STEEL | STEEL | δ | 0.0676 | 0.0676 | 0.0676 |
| | | | σs | 23.78 | 23.78 | 23.78 |
| | | | Pr | 1.0 | 1.0 | 1.0 |
| 2 | Cu—Cr | STEEL | δ | 0.1037 | 0.1297 | 0.1459 |
| | | | σs | 23.70 | 29.65 | 33.35 |
| | | | Pr | 1.0 | 1.251 | 1.407 |
| 3 | Cu—Fe—Zn—P | STEEL | δ | 0.1099 | 0.1341 | 0.1492 |
| | | | σs | 23.74 | 28.98 | 32.24 |
| | | | Pr | 1.0 | 1.220 | 1.357 |
| 4 | STEEL | ALUMINUM ALLOY | δ | 0.0815 | 0.0546 | 0.0378 |
| | | | σs | 23.72 | 15.89 | 11.00 |
| | | | Pr | 1.0 | 0.670 | 0.464 |
| 5 | Cu—Cr | ALUMINUM ALLOY | δ | 0.1176 | 0.1167 | 0.1161 |
| | | | σs | 23.73 | 23.55 | 23.43 |
| | | | Pr | 1.0 | 0.993 | 0.987 |
| 6 | Cu—Fe—Zn—P | ALUMINUM ALLOY | δ | 0.1298 | 0.1211 | 0.1194 |
| | | | σs | 23.65 | 23.14 | 22.81 |
| | | | Pr | 1.0 | 0.978 | 0.965 |

(Calculation Result where Pr is 1 at 20° C.)
δ(mm): Interrefence
σs(Kgf/mm$^2$): Circumferential maximum stress
Pr(Kgf/mm$^2$): Radial stress

TABLE 3 (2)

CONDITION OF CALCULATION (1) METAL SIZE
  OUTER DIAMETER: 56 mm
  THICKNESS OF BACK METAL: 1.2 mm
  DIAMETER RATIO OF HOUSING: 1.5 mm
(2) BACKING METAL MATERIAL

| KIND | YOUNG'S MODULUS | POISSON'S RATIO | COEFFICIENT OF THERMAL EXPANSION |
|---|---|---|---|
| STEEL | 21000 | 0.30 | 12.0E-6 |
| Cr—Cu | 13100 | 0.30 | 17.8E-6 |
| Cu—Fe—Zn—P | 13100 | 0.30 | 17.4E-6 |

TABLE 3 (2)-continued

CONDITION OF CALCULATION (3) HOUSING MATERIAL

| KIND | YOUNG'S MODULUS | POISSON'S RATIO | COEFFICIENT OF THERMAL EXPANSION |
|---|---|---|---|
| STEEL | 21000 | 0.30 | 12.0E-6 |
| ALUMINYM ALLOY | 7600 | 0.33 | 18.0E-6 |

TABLE 4

| CONDITION OF SEIZURE TEST | |
|---|---|
| TEST CONDITION | |
| SHAFT DIAMETER | 53 mm |
| WIDTH OF BEARING | 16 mm |
| CIRCUMFERENTIAL SPEED | 7200 rpm |
| PERIPHERAL SPEED | 20 m/sec |
| LURICANT OIL | MACHINE OIL 22 |
| INLET TEMPERATURE | 100–110° C. |
| OIL SUPPLY RATE | 150 cc/min |
| SHAFT MATERIAL | JIS S 55C — |
| SURFACE ROUGHNESS OF SHAFT | Rmax NOT MORE THAN 0.8 μm |

What is claimed is:

1. A multilayer slide bearing in which an overlay bearing layer having a thickness of 3 to 50 μm is formed on the surface of a copper alloy layer having a coefficient of thermal expansion of $15 \times 10^{-6}/°C$. or more, a coefficient of thermal conductivity of 0.40 cal/cm sec °C. or more, and 0.2% proof stress of 295 N/mm² or more.

2. A multilayer slide bearing according to claim 1, wherein an intermediate layer having a thickness of 0.5 to 5 μm, the intermediate layer being made of one kind of metal selected from the group consisting of Ni, Co, Fe, Ag and alloys each containing and of those elements as a main component, is provided between said copper alloy layer and said overlay bearing layer.

3. A multilayer slide bearing according to claim 2, wherein said overlay bearing layer is made of a lead alloy containing by 2 to 30 wt. % in total one or more kinds of metals selected from the group consisting of Sn, In, Sb and Cu.

4. A multilayer slide bearing according to claim 3, wherein Sn, Pb, a Sn alloy or a Pb alloy is flash-plated on an entirety surface of the bearing to have a thickness of 0.1 to 10 μm.

5. A bearing assembly in which the multilayer slide bearing as set forth in claim 4 is retained within a housing of an aluminum alloy.

6. A multilayer slide bearing according to claim 2, wherein said overlay bearing layer is made of an aluminum alloy containing by 2 to 60 wt. % in total one or more kinds of metals selected from the group consisting of Sn, Pb and Sb.

7. A multilayer slide bearing according to claim 6, wherein Sn, Pb, a Sn alloy or a Pb alloy is flash-plated on an entirety surface of the bearing to have a thickness of 0.1 to 10 μm.

8. A bearing assembly in which the multilayer slide bearing as set forth in claim 7 is retained within a housing of an aluminum alloy.

9. A multilayer slide bearing according to claim 2, wherein Sn, Pb, a Sn alloy or a Pb alloy is flash-plated on an entirety surface of the bearing to have a thickness of 0.1 to 10 μm.

10. A bearing assembly in which the multilayer slide bearing as set forth in claim 2 is retained within a housing of an aluminum alloy.

11. A multilayer slide bearing according to claim 1, wherein said overlay bearing layer is made of a lead alloy containing by 2 to 30 wt. % in total one or more kinds of metals selected from the group consisting of Sn, In, Sb and Cu.

12. A multilayer slide bearing according to claim 11, wherein Sn, Pb, a Sn alloy or a Pb alloy is flash-plated on an entirety surface of the bearing to have a thickness of 0.1 to 10 μm.

13. A bearing assembly in which the multilayer slide bearing as set forth in claim 12 is retained within a housing of an aluminum alloy.

14. A bearing assembly in which the multilayer slide bearing as set forth in claim 11 is retained within a housing of an aluminum alloy.

15. A multilayer slide bearing according to claim 1, wherein said overlay bearing layer is made of an aluminum alloy containing by 2 to 60 wt. % in total one or more kinds of metals selected from the group consisting of Sn, Pb and Sb.

16. A multilayer slide bearing according to claim 15, wherein Sn, Pb, a Sn alloy or a Pb alloy is flash-plated on an entirety surface of the bearing to have a thickness of 0.1 to 10 μm.

17. A bearing assembly in which the multilayer slide bearing as set forth in claim 15 is retained within a housing of an aluminum alloy.

18. A multilayer slide bearing according to claim 1, wherein Sn, Pb, a Sn alloy or a Pb alloy is flash-plated on an entirety surface of the bearing to have a thickness of 0.1 to 10 μm.

19. A bearing assembly in which the multilayer slide bearing as set forth in claim 1 is retained within a housing of an aluminum alloy.

20. A multilayer slide bearing, consisting essentially of:
a copper alloy backing layer having a coefficient of thermal expansion of at least $15 \times 10^{-6}/°C$., a coefficient of thermal conductivity of at least 0.4 cal/cm sec °C., and 0.2% proof stress of at least 295N/mm²; and
an overlay bearing layer having a thickness in the range of about 3 to 50 μm on said copper alloy layer.

* * * * *